May 31, 1949.  F. I. GALEY  2,471,521
MEANS FOR TRANSPORTING MOTOR VEHICLES
Filed Nov. 24, 1947  2 Sheets-Sheet 1
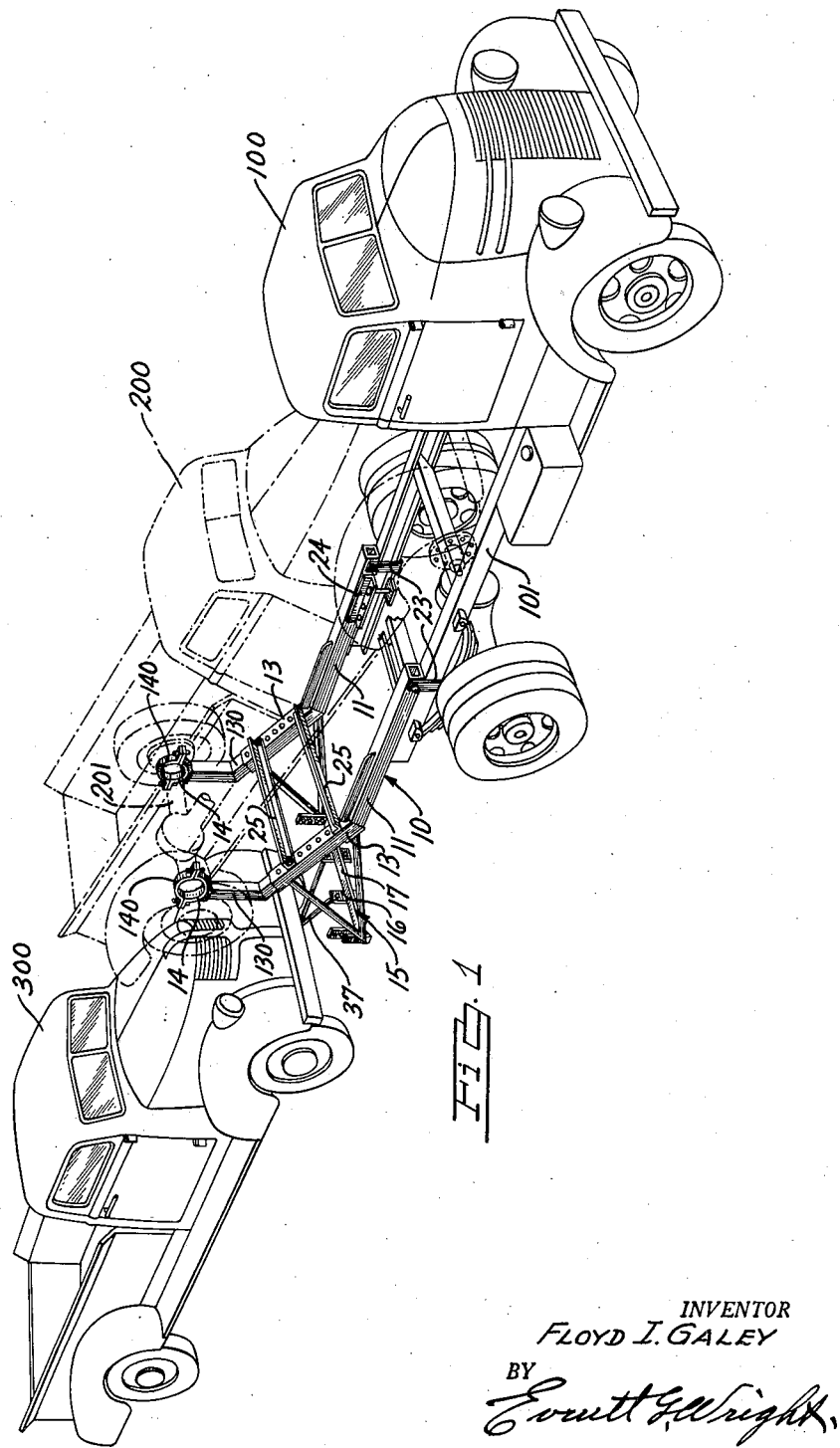
INVENTOR
FLOYD I. GALEY
BY
Everett G. Wright,
ATTORNEY

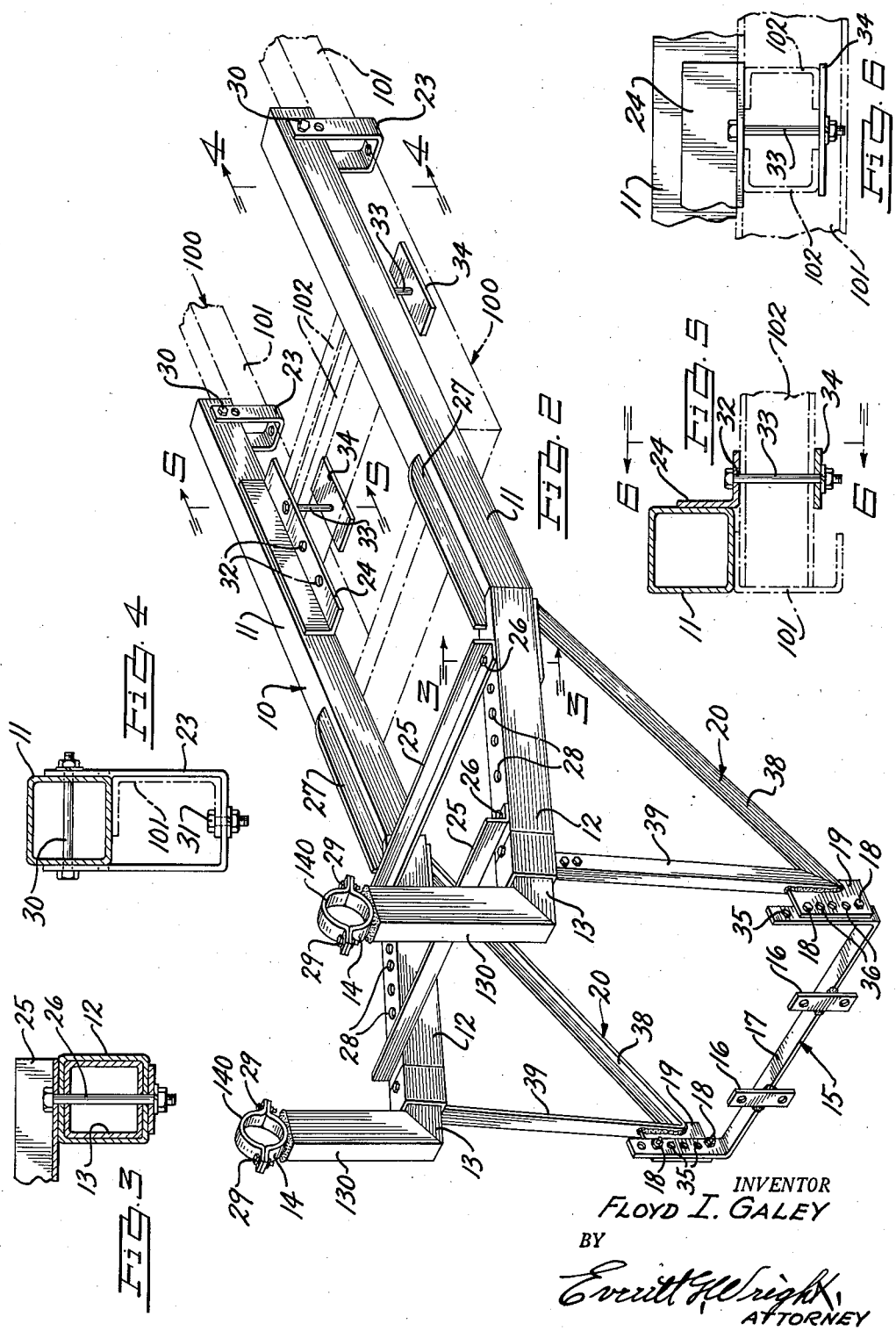

Patented May 31, 1949

2,471,521

UNITED STATES PATENT OFFICE 2,471,521

MEANS FOR TRANSPORTING MOTOR VEHICLES

Floyd I. Galey, Detroit, Mich.

Application November 24, 1947, Serial No. 787,685

10 Claims. (Cl. 280—33.44)

This invention relates to means for transporting motor vehicles and in particular to means for carrying one motor vehicle on the chassis of another which serves as the transport or drive-a-way vehicle and, if desired, the simultaneous towing of a third vehicle.

In the prior art, many and devious means have been employed to load or secure one vehicle upon another for the delivery of a second vehicle by a transport or drive-a-way vehicle usually from the plant of a manufacturer to a dealer and to tow vehicles by drive-a-way vehicles, from the plant of a manufacturer to dealers. Heretofore, wood blocking, bolsters, universal hitches and many other means for loading or securing one vehicle onto another and for towing vehicles have been used; however, none has proven completely satisfactory because of the expense of labor and material involved and the general inadequacy and insecurity of manual haphazard blocking up or bolstering of one vehicle on top of another and anchoring of one or more vehicles being transported or towed to the transport or drive-a-way vehicle.

With the foregoing in view, it is the primary object of the invention to provide means for transporting motor vehicles comprising a combined frame extension and extensible bolster for supporting and anchoring one vehicle on the chassis of another vehicle, said frame extension and extensible bolster including a tow bar anchorage which readily adapts the transport vehicle to serve also as a tow vehicle.

A further object of the invention is to provide means for the transporting of one vehicle by another, usable also for transporting one vehicle by another vehicle and simultaneously towing a third vehicle, all safely and economically with one vehicle serving as a transport or drive-a-way vehicle employing a single driver.

Another object of the invention to provide means for transporting and delivering two or three vehicles by a single driver with complete safety and at a minimum expense in time and material in preparing the said vehicles for transportation.

Other objects of the invention will become apparent by reference to the following detailed description taken in connection with the accompanying drawings, in which:

Fig 1 is a view in perspective showing a single transport vehicle employing a preferred embodiment of the invention to carry one vehicle and tow another.

Fig. 2 is an enlarged view in perspective showing means embodying the invention preferably employed to bolster, support and anchor one vehicle to be transported onto the chassis of another which serves simultaneously as a tow bar anchorage for towing a third vehicle.

Fig. 3 is an enlarged sectional view taken on the line 3—3 of Fig. 2.

Fig. 4 is an enlarged vertical sectional view taken on the line 4—4 of Fig. 2.

Fig. 5 is an enlarged vertical sectional view taken on the line 5—5 of Fig. 2.

Fig. 6 is a fragmentary elevational view taken on the line 6—6 of Fig. 5.

Referring now to the drawings wherein like numerals refer to like and corresponding parts throughout the several views, the preferred embodiment of the invention disclosed for illustrative purposes comprises, in general, a combined frame extension and extensible bolster 10 composed of a pair of fixed tubular frame extension members 11 including upwardly and rearwardly disposed arms 12 into which are telescoped extensible bolsters 13 having upwardly disposed axle supporting arms 130 onto which are disposed axle cradles 14 including axle clamping elements 140, and a tow bar anchorage 15 composed of tow bar anchorage plates 16 welded or otherwise secured to a transversely disposed vertically adjustable bar 17 fixed by such means as bolts 18 to gussets 19 which are welded or otherwise secured to the lower end of a pair of tow frames 20 welded or otherwise secured to the upwardly and rearwardly disposed arms 12 of the tubular frame extension 10; the said combined frame extension and extensible bolster 10 being secured to the main frame 101 of a transport vehicle chassis 100 by means of pairs of anchors 23 and 24 and prevented from lateral distortion by spacers 25 preferably fixed to the said combined frame extension and extensible bolster 10 by the bolts 26 employed to secure the extensible bolsters 13 in the desired extended and elevated position with respect to the portion of the upwardly and rearwardly disposed arms 12 of the frame extension members 11.

The tubular frame extension members 11 are preferably square or rectangular in shape and have the upwardly and rearwardly disposed arms 12 which are extensions thereof welded thereto along the joint therebetween. A gusset 27 welded along the top of each frame extension member 11 and the rearwardly and upwardly disposed arm 12 extending therefrom reinforces the joint therebetween. The bolsters 13 and their upwardly disposed axle supporting arms 130 are preferably square or rectangular in shape and of such a size as will telescope closely within the arms 12 of the tubular frame extension members 11. The said bolsters 13 and arms 12 have a plurality of longitudinally spaced apertures 28 therethrough through which the bolts 26 are positioned to secure the bolsters 13 in the desired extended position. The said bolts 26 also secure the spacers 25 in place transversely across the top of the upwardly and rearwardly disposed arms 12 as indicated in Figs. 2 and 3. These spacers 25 are preferably angle irons and prevent lateral sway and distortion of the frame extension members 11, their rearwardly disposed arms 12 and the bolsters 13 telescoped therein during use of the combined frame extension and extensible bolster 10.

On the upper end of each of the axle supporting arms 130 of the bolsters 13 is welded an axle cradle 14 which has an axle clamping member 140 thereon. Bolts 29 extend generally vertically through suitable apertures in the axle cradles 14 and clamping members 140 and securely hold the axle of a vehicle therein as indicated in Fig. 1. A suitable liner such as a felt pad or the like, not shown, is generally employed between the axle cradle 14, the axle clamping member 140 and the axle 201 of a vehicle 200 supported and engaged thereby to prevent scratching or wearing of the paint on the axle during the transport of a vehicle on the combined frame extension and extensible bolster embodying the invention.

Each of the tubular frame extension members 11 of the combined frame extension and extensible bolster 10 is anchored to the top of the longitudinal frame member 101 of the transport vehicle 100 by means of a U-shaped anchorage member 23 disposed around the longitudinal frame member 101 of the transport vehicle 100 and secured to the tubular frame extension member 11 near the end thereof by means of a bolt 30 transversely disposed through the said U-shaped anchorage member 23 and the tubular frame extension member 11, see Figs. 2 and 4. To prevent creeping of the combined frame extension and extensible bolster 10 with respect to the longitudinal frame members 101 of the transport vehicle 100, a bolt 31 is disposed through the bottom of each of the said U-shaped anchorage members 23, see Figs. 2 and 4.

Each tubular frame extension member 11 has welded longitudinally along the inside thereof an anchorage member 24 which is preferably a short angle iron and has suitable apertures 32 therethrough which accommodate a bolt 33 that extends downwardly between transverse frame members 102 of the transport vehicle 100 and through an apertured anchorage plate 34 which spans between the said transverse frame members 102 of the transport vehicle 100, see Figs. 2, 5 and 6.

Thus, the combined frame extension and extensible bolster 10 may be secured to the longitudinal frame members 101 of the transport vehicle 100 at the desired longitudinal relationship thereto to accommodate a second vehicle 100 as shown in Fig. 1. By adjusting the bolsters 13 and their axle supporting arms 130 outwardly or inwardly with respect to the rearwardly and upwardly disposed arms 12 of the combined frame extension and extensible bolster 10, a longer or shorter vehicle 200 may be carried by the transport vehicle 100 while the rear axle 201 of the vehicle 200 is supported and anchored in the axle cradles 14, the front end of the vehicle 200 is supported on the frame 101 of the transport vehicle 100 and may be lashed thereto by rope or other means, not shown.

To effect a saving in the delivery of vehicles, it is desirable for one transport vehicle and one driver to deliver at least three vehicles. Accordingly, a tow bar anchorage generally designated by the numeral 15 is provided. The tow bar anchorage 15 comprises a pair of tow bar anchorage plates 16 welded or otherwise secured to a transversely disposed bar 17 turned upwardly at its ends at 170 which are provided with a plurality of apertures 35 which register with apertures 36 in gussets 19 so that bolts 18 may secure the said bar 17 at the proper elevation to permit a suitable tow hitch 37 connected to the towed vehicle 300 to be connected to the tow bar anchorage plates 16. The said gussets 19 are preferably welded to the lower end of tow frames 20 each of which comprises a tension member 38 and a compression member 39 welded together at the gusset 19 and bolted or otherwise secured to an upwardly and rearwardly disposed arm 12 of the tubular frame extension member 11 of the combined frame extension and extensible bolster 10.

The foregoing construction permits the extensible bolster 13 and axle supporting arms 130 to be extended rearwardly and upwardly to accommodate a relatively long vehicle 200 to be carried by the transport vehicle 100 and at the same time permit a third vehicle 300 to be towed by the transport vehicle 100 in safe closely coupled relationship thereto. It will be observed that, by employing the combined frame extension and extensible bolster 10 embodying the invention including the adjustable tow bar anchorage generally designated by the numeral 15 as a part thereof, a relatively long vehicle 200 may be carried by the transport vehicle 100 and, at the same time, the towed vehicle 300 is closely coupled to the transport vehicle 100.

Complete flexibility of choice of transport vehicle, a vehicle to be carried and a vehicle to be towed is afforded by employing the invention with assurance of safe and proper bolstering of the vehicle to be carried onto the transport vehicle and a closely coupled hitch regardless of the length of the vehicle being carried by the transport vehicle, all of which lends safety and economy to the transporting of either two or three vehicles while using one of the said vehicles as a transport vehicle and with but one driver.

Although but a single embodiment of the invention has been disclosed and described in detail, it is obvious that many changes may be made in the size, shape, arrangement and detail of the various elements of the invention without departing from the spirit and scope thereof as defined by the appended claims.

I claim:

1. Means for transporting one motor vehicle on another motor vehicle serving as a transport vehicle comprising a frame extension including upwardly and rearwardly disposed arms, an extensible bolster composed of a pair of extension members supported by and extensible with respect to the said frame extension arms and having upwardly disposed axle supporting arms at the ends thereof, an axle supporting cradle at the upper end of each of the said axle supporting arms, means for removably securing the rear axle of the vehicle to be transported in the said cradles, and means for removably securing the said frame extension to the said transport vehicle.

2. Means for transporting one motor vehicle on another motor vehicle serving as a transport vehicle and towing a third vehicle comprising a frame extension including upwardly and rearwardly disposed arms, an extensible bolster composed of a pair of extension members supported by and extensible with respect to the said frame extension arms and having upwardly disposed axle supporting arms at the ends thereof, an axle supporting cradle at the upper end of each of the said axle supporting arms, means for removably securing the rear axle of the vehicle to be transported in the said cradles, a towbar anchorage suspended from the said upwardly and rearwardly disposed frame extension arms, and means for removably securing the said frame extension to the said transport vehicle.

3. Means for transporting one motor vehicle on another motor vehicle serving as a transport vehicle comprising a pair of tubular frame extension members each including upwardly and rearwardly disposed arms, an extensible bolster composed of a pair of extension members telescoped in extensible relationship within the said frame extension member arms and having upwardly disposed axle supporting arms at the ends thereof, an axle supporting cradle at the upper end of each of the said axle supporting arms, means for removably securing the said frame extension to the said transport vehicle, means for fixing the said extensible bolster in the desired extended position with respect to the said frame extension, and means for removably securing the rear axle of the vehicle to be transported in the said axle supporting cradles.

4. Means for transporting one motor vehicle on another motor vehicle serving as a transport vehicle and towing a third vehicle comprising a pair of tubular frame extension members including upwardly and rearwardly disposed arms, an extensible bolster composed of a pair of extension members telescoped in extensible relationship within the said frame extension member arms and having upwardly disposed axle supporting arms at the ends thereof, and an axle supporting cradle at the upper end of each of the said axle supporting arms, a towbar anchorage suspended from the said upwardly and rearwardly disposed frame extension arms, means for removably securing the said frame extension to the said transport vehicle, means for fixing the said extensible bolster in the desired extended position with respect to the said frame extension, and means for removably securing the rear axle of the vehicle to be transported in the said axle supporting cradles.

5. Means for transporting one motor vehicle on another motor vehicle serving as a transport vehicle comprising a pair of tubular frame extension members each including an upwardly and rearwardly disposed arm, an extensible bolster composed of a pair of extension members each telescoped in extensible relationship within a frame extension member arm and having an upwardly disposed axle supporting arm at the end thereof, and an axle supporting cradle at the upper end of each of the said axle supporting arms, means for removably securing the said frame extension to the said transport vehicle, means including transverse brace members disposed between and bracing the said upwardly and rearwardly disposed frame extension arm fixing the said extensible bolster in the desired extended position with respect to the said frame extension arms, and means for removably securing the rear axle of the vehicle to be transported in the said axle supporting cradle.

6. Means for transporting one motor vehicle on another motor vehicle serving as a transport vehicle and towing a third vehicle comprising a pair of tubular frame extension members each including upwardly and rearwardly disposed arms, an extensible bolster composed of a pair of extension members each telescoped in extensible relationship within a frame extension member arm and having an upwardly disposed axle supporting arm at the end thereof and an axle supporting cradle at the upper end of each of the said axle supporting arms, a towbar anchorage suspended from the said upwardly and rearwardly disposed frame extension arms, means for removably securing the said frame extension to the said transport vehicle, means including transverse brace members disposed between and bracing the said upwardly and rearwardly disposed frame extension arms fixing the said extensible bolster in the desired extended position with respect to the said frame extension arms, and means for removably securing the rear axle of the vehicle to be transported in the said axle supporting cradle.

7. Means for transporting one motor vehicle on another motor vehicle serving as a transport vehicle and towing a third vehicle comprising a pair of tubular frame extension members each including upwardly and rearwardly disposed arms, an extensible bolster composed of a pair of extension members each telescoped in extensible relationship within a frame extension member arm and having an upwardly disposed axle supporting arm at the end thereof and an axle supporting cradle at the upper end of each of the said axle supporting arms, a towbar anchorage including means for suspending the same from the said upwardly and rearwardly disposed frame extension arms and means for securing the said towbar anchorage at the desired level with respect to the towbar suspension means, means for removably securing the said frame extension to the said transport vehicle, means including transverse brace members disposed between and bracing the said upwardly and rearwardly disposed frame extension arms fixing the said extensible bolster in the desired extended position with respect to the said frame extension arms, and means for removably securing the rear axle of the vehicle to be transported in the said axle supporting cradle.

8. Means for transporting one motor vehicle on another motor vehicle serving as a transport vehicle comprising a pair of tubular frame extension members each including an upwardly and rearwardly disposed arm, an extensible bolster composed of a pair of extension members each telescoped in extensible relationship within a frame extension member arm and having an upwardly disposed axle supporting arm at the end thereof, and an axle supporting cradle at the upper end of each of the said axle supporting arms, a U-shaped anchorage pivoted through each tubular frame extension member extending around the frame of the transport vehicle and anchored thereto, transverse brace members disposed between and bracing the said upwardly and rearwardly disposed frame extension arms, securing elements fixing the said extensible bolster in the desired extended position with respect to the said frame extension arms, and clamping elements removably securing the rear axle of the vehicle to be transported in the said axle supporting cradle.

9. Means for transporting one motor vehicle on another motor vehicle serving as a transport vehicle and towing a third vehicle comprising a pair of tubular frame extension members each including an upwardly and rearwardly disposed arm, an extensible bolster composed of a pair of extension members each telescoped in extensible relationship within a frame extension member arm and having an upwardly disposed axle supporting arm at the end thereof, and an axle supporting cradle at the upper end of each of the said axle supporting arms, a U-shaped anchorage pivoted through each tubular frame extension member extending around the frame of the transport vehicle and anchored thereto, transverse brace members disposed between and bracing the said upwardly and rearwardly disposed frame extension arms, securing elements fixing the said extensible bolster in the desired extended position with respect to the said frame extension arms, a towbar anchorage composed of a frame fixed to and suspended from each of the said upwardly and rearwardly disposed frame extension member arms and a transversely disposed vertically adjustable bar secured to the said frame adopted to receive a towbar extending to the vehicle to be towed, and clamping elements removably securing the rear axle of the vehicle to be transported in the said axle supporting cradle.

10. Means for transporting one motor vehicle on another motor vehicle serving as a transport vehicle and towing a third vehicle comprising a pair of tubular frame extension members each including an upwardly and rearwardly disposed arm, an extensible bolster composed of a pair of extension members each telescoped in extensible relationship within a frame extension member arm and having an upwardly disposed axle supporting arm at the end thereof, and an axle supporting cradle at the upper end of each of the said axle supporting arms, a U-shaped anchorage pivoted through each tubular frame extension member extending around the frame of the transport vehicle and anchored thereto, a second anchorage longitudinally spaced from the said U-shaped anchorage securing each tubular frame extension member to the frame of the said transport vehicle, transverse brace members disposed between and bracing the said upwardly and rearwardly disposed frame extension arms, securing elements fixing the said extensible bolster in the desired extended position with respect to the said frame extension arms, a towbar anchorage composed of a frame fixed to and suspended from each of the said upwardly and rearwardly disposed frame extension member arms and a transversely disposed vertically adjustable bar secured to the said frame adopted to receive a towbar extending to the vehicle to be towed, and clamping elements removably securing the rear axle of the vehicle to be transported in the said axle supporting cradle.

FLOYD I. GALEY.

REFERENCES CITED

The following references are of record in the file of this patent:

UNITED STATES PATENTS

| Number | Name | Date |
|---|---|---|
| 1,860,518 | Wells | May 31, 1932 |
| 2,108,968 | Judd | Feb. 22, 1938 |

FOREIGN PATENTS

| Number | Country | Date |
|---|---|---|
| 165,354 | Switzerland | Nov. 15, 1933 |